(12) United States Patent
Fukari et al.

(10) Patent No.: US 10,988,235 B2
(45) Date of Patent: Apr. 27, 2021

(54) HYBRID TYPE ROTORCRAFT HAVING A HORIZONTAL STABILIZER AND TWO FINS ARRANGED ON THE HORIZONTAL STABILIZER

(71) Applicants: AIRBUS HELICOPTERS, Marignane (FR); ONERA (OFFICE NATIONAL D'ETUDES ET DE RECHERCHES AEROSPATIALES), Palaiseau (FR)

(72) Inventors: Raphael Fukari, Le Rove (FR); Remy Huot, Marseilles (FR); Paul Eglin, Roquefort la Bedoule (FR); Jean-Paul Pinacho, Molleges (FR); Caroline Lienard, Suresnes (FR); Itham Salah El Din, Meudon (FR)

(73) Assignees: AIRBUS HELICOPTERS, Marignane (FR); ONERA (OFFICE NATIONAL D'ETUDES ET DE RECHERCHES AEROSPATIALES), Palaiseau (FR)

( * ) Notice: Subject to any disclaimer, the term of this patent is extended or adjusted under 35 U.S.C. 154(b) by 273 days.

(21) Appl. No.: 16/164,915

(22) Filed: Oct. 19, 2018

(65) Prior Publication Data
US 2019/0161164 A1 May 30, 2019

(30) Foreign Application Priority Data
Nov. 30, 2017 (FR) ...................................... 1771290

(51) Int. Cl.
*B64C 5/06* (2006.01)
*B64C 5/02* (2006.01)
*B64C 27/26* (2006.01)

(52) U.S. Cl.
CPC .................. *B64C 5/06* (2013.01); *B64C 5/02* (2013.01); *B64C 27/26* (2013.01)

(58) Field of Classification Search
CPC .............. B64C 5/06; B64C 5/02; B64C 27/26
See application file for complete search history.

(56) References Cited

U.S. PATENT DOCUMENTS

| 2,940,693 A | 6/1960 | Hislop |
| 8,181,901 B2 | 5/2012 | Roesch |
| (Continued) | | |

FOREIGN PATENT DOCUMENTS

| EP | 1829782 A2 | 5/2007 |
| EP | 2733066 A1 | 5/2014 |
| (Continued) | | |

OTHER PUBLICATIONS

Russian Search Report for Application No. 2018145515/11, dated Aug. 8, 2019, 2 pages.
(Continued)

*Primary Examiner* — Justin M Benedik
(74) *Attorney, Agent, or Firm* — Brooks Kushman P.C.

(57) ABSTRACT

A hybrid type rotorcraft having a main rotor, at least two propulsion elements each mounted on respective half-wings arranged symmetrically on either side of an anteroposterior midplane XOZ, a horizontal stabilizer arranged in a rear zone of the rotorcraft on either side of the anteroposterior midplane XOZ, and two fins arranged respectively on either side of the anteroposterior midplane XOZ, each of the two fins comprising a respective left/right bottom fin airfoil arranged below the horizontal stabilizer and a respective left/right top fin airfoil arranged above the horizontal stabilizer.

20 Claims, 3 Drawing Sheets

(56) References Cited

U.S. PATENT DOCUMENTS

| | | | |
|---|---|---|---|
| 8,292,225 B2 | 10/2012 | Cazals et al. | |
| 8,651,414 B2 | 2/2014 | Cazals et al. | |
| 9,315,263 B2 | 4/2016 | Cacciaguerra | |
| 2013/0134256 A1* | 5/2013 | Gaillard | B64C 27/82 244/17.21 |
| 2013/0256460 A1 | 10/2013 | Roman et al. | |
| 2014/0319265 A1 | 10/2014 | Cacciaguerra | |
| 2015/0203190 A1 | 7/2015 | Witte et al. | |

FOREIGN PATENT DOCUMENTS

| | | |
|---|---|---|
| FR | 2916418 A1 | 11/2008 |
| FR | 2937302 A1 | 4/2010 |
| FR | 2943039 A1 | 9/2010 |
| RU | 2627965 C1 | 8/2017 |
| RU | 2629478 * | 8/2017 |
| RU | 2629478 C2 | 8/2017 |
| WO | 2016053408 A1 | 4/2016 |
| WO | 2016054223 A1 | 4/2016 |

OTHER PUBLICATIONS

Russian Office Action for Application No. 2018145515/11, dated Aug. 13, 2019, 4 pages.
Korean Office Action (with English Translation), dated Jun. 10, 2020, Application No. 10-2018-0168242, Applicant Airbus Helicopters, 6 Pages.
French Search Report for Application No. 1771290, Completed by the French Patent Office, dated Jul. 5, 2018, 6 pages.

* cited by examiner

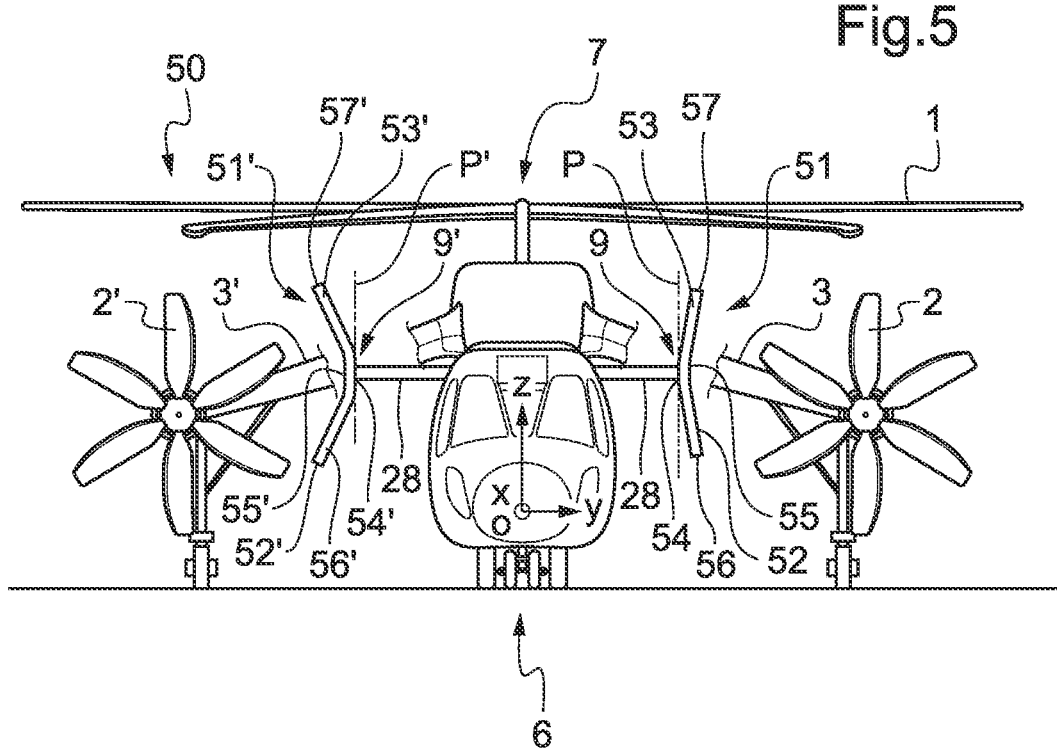

HYBRID TYPE ROTORCRAFT HAVING A HORIZONTAL STABILIZER AND TWO FINS ARRANGED ON THE HORIZONTAL STABILIZER

CROSS-REFERENCE TO RELATED APPLICATIONS

This application claims priority to French patent application No. FR 1771290 filed on Nov. 30, 2017, the disclosure of which is incorporated in its entirety by reference herein.

BACKGROUND OF THE INVENTION

(1) Field of the Invention

The project that led to drafting this patent application has received funding from the Horizon 2020 research and innovation program of the European Union in the context of the CleanSky 2 grant agreement No. "GAM-FRC-2014-001 Issue E" and from ITD Airframe Amendment No. "Grant agreement CSJU-CS2-GAM-AIR-2014-15-01 Annex 1—Issue B04—Date: Oct. 2, 2015".

The present invention relates to the field of hybrid type rotorcraft. Such rotorcraft have a main rotor serving to provide lift and possibly also propulsion for the rotorcraft together with at least two propellers for providing a propulsive force in addition to that produced by the main rotor.

2) Description of Related Art

The Applicant has in particular described a hybrid rotorcraft of this type in Document FR 2 916 418. Specifically, that document describes a hybrid helicopter in which propulsion is provided by two propellers driven by the two turboshaft engines, one propeller being arranged at the outer end of each half-wing and forming a propulsive element for providing all or some of the propulsion of the rotorcraft.

Furthermore, such a document describes, in the vicinity of the rear end of the fuselage, stabilization and control surfaces in particular both for pitching, comprising a horizontal stabilizer with two pitch control surfaces movable relative to a front portion, and also for steering, comprising two fins, with each fin being arranged at one end of the horizontal stabilizer. Specifically, the horizontal stabilizer and the fins form an upside-down U-shape.

Still according to Document FR 2 916 418, such fins can be arranged vertically or in a manner that is inclined relative to the vertical.

Nevertheless, when the fins are arranged in inclined manner relative to the vertical, one free end of each fin goes away from the anteroposterior midplane of the rotorcraft while the other end is secured to the horizontal stabilizer. Such an upside-down U-shape can then lead to problems of vibration in the fuselage due to air flows coming from the main rotor, interacting in particular with the stabilizer and the fins, these interactions being referred to below as "couplings".

Furthermore, and as described by the Applicant in Document EP 2 733 066, it is also known to provide a hybrid type rotorcraft with a horizontal stabilizer having left and right vertical fins arranged thereon, each having a respective bottom fin airfoil positioned vertically below the horizontal stabilizer and a top fin airfoil positioned vertically above the horizontal stabilizer.

Nevertheless, although that type of H-shaped stabilizer is effective in keeping the fins away from the anteroposterior midplane of the rotorcraft, which is greatly disturbed by the wake from the fuselage, from the engine covers, and from the head of the main rotor, that requires the horizontal stabilizer to present a large span. In addition, such a span can be ineffective in providing stabilization and may even give rise to problems of behavior and generate low-speed interaction that tends to raise the nose of the rotorcraft beyond visibility limits for the pilot as a result of the air stream from the main rotor impacting on the stabilizer. That type of low-speed interaction can be referred to by the term "attitude hump".

Furthermore, as described in Document U.S. Pat. No. 2,940,693, rotorcraft are also known that have H-shaped stabilizers presenting bottom fin airfoils, or alternatively top fin airfoils that can be turned relative to the horizontal stabilizer.

Under such circumstances, such a movable arrangement of top fin airfoils is combined with a stationary arrangement of bottom fin airfoils. That stationary arrangement of bottom fin airfoils is also parallel to an anteroposterior midplane of symmetry of the rotorcraft.

In addition, arranging the top fin airfoils to be movable enables the horizontal stabilizer to occupy a high position, above the tail boom, and avoids any risk of collision between the blades of the main rotor and the free ends of the top fin airfoils.

Conversely, an arrangement in which the bottom fin airfoils are movable is combined with an arrangement in which the top fin airfoils are stationary. The top fin airfoils in that stationary arrangement are also likewise parallel to an anteroposterior midplane of symmetry of the rotorcraft.

In this other variant, having the bottom fin airfoils arranged to be movable enables the horizontal stabilizer to occupy a low position, under the tail boom, and avoids any risk of collision between the ground and the free ends of the bottom fin airfoils.

Nevertheless, as above for H-shaped stabilizers, such an arrangement implies a large span for the horizontal stabilizer. Such a span can thus give rise to problems of behavior and can generate interaction at low speed that tends to raise the nose of the rotorcraft above visibility limits for the pilot. Such a movable arrangement of the top (or bottom) airfoils therefore does not provide a solution for avoiding the stabilizer disturbing the air stream generated by the main rotor.

BRIEF SUMMARY OF THE INVENTION

An object of the present invention is thus to propose a rotorcraft that enables the above-mentioned limitations to be obviated. In addition, the rotorcraft in accordance with the invention makes it possible to reduce or even to avoid the above-mentioned vibration problems specific to stabilizers of upside-down U-shape that can potentially give rise to the air flow separating at the junction between the fins and the horizontal stabilizer.

Another object of the invention is to limit the span of the horizontal stabilizer so as to stabilize the rotorcraft optimally without generating low-speed interaction of the attitude hump type.

The invention thus provides a hybrid type rotorcraft comprising:

a main rotor providing at least the rotorcraft with all or part of its lift;

at least two propulsion elements providing all or part of propulsion of the rotorcraft, the two propulsion elements each being mounted on a respective half-wing, the half-wings being arranged symmetrically on either side of an anteroposterior midplane XOZ of symmetry of all or part of the rotorcraft, the anteroposterior midplane XOZ extending between a front zone and a rear zone of the rotorcraft in a longitudinal direction X and between a bottom zone and a top zone of the rotorcraft in a direction in elevation Z;

a horizontal stabilizer arranged in the rear zone of the rotorcraft on either side of the anteroposterior midplane XOZ; and two fins arranged on respective sides of the anteroposterior midplane XOZ, the two fins consisting in a left fin positioned at a left distal zone of the horizontal stabilizer and a right fin positioned at a right distal zone of the horizontal stabilizer, each of the left/right fins respectively comprising a left/right bottom fin airfoil arranged below the horizontal stabilizer and a left/right top fin airfoil arranged above the horizontal stabilizer, the left bottom/top fin airfoils and the right bottom/top fin airfoils being rigidly secured to the horizontal stabilizer.

According to the invention, such a rotorcraft is remarkable in that the left bottom fin airfoil approaches the left top fin airfoil from their respective junctions with the horizontal stabilizer and the right bottom fin airfoil approaches the right top fin airfoil from their respective junctions with the horizontal stabilizer, the left bottom/top fin airfoils extending in full or in part, at least in their free ends, away from the anteroposterior midplane XOZ, and the right bottom/top fin airfoils extending in full or in part, at least at their free ends, away from the anteroposterior midplane XOZ.

In other words, for each left/right fin, the top and bottom fin airfoils do not extend parallel relative to the anteroposterior midplane XOZ. These top and bottom fin airfoils extend away from the anteroposterior midplane XOZ, thereby enabling the span of the horizontal stabilizer to be limited.

In addition, such an arrangement also serves to reduce or even to avoid problems of air flows separating at the junctions between the two fins and the horizontal stabilizer, to reduce the aerodynamic drag of the rotorcraft, and to optimize the tail stabilizer assembly in terms of surface area and weight.

Advantageously, in a transverse plane YOZ perpendicular to the anteroposterior midplane XOZ and intersecting the two fins, all four of the left/right and bottom/top fin airfoils may have respective first ends secured to the horizontal stabilizer and respective free ends, the free ends of the left bottom/top fin airfoils co-operating with the first ends of the left bottom/top fin airfoils to form a dihedral of angle lying in the range 90 degrees to 175 degrees, and the free ends of the right bottom/top fin airfoils co-operating with the first ends of the right bottom/top fin airfoils to form a dihedral of angle lying in the range 90 degrees to 175 degrees.

In other words, for each left/right fin, its bottom/top fin airfoils approach each other forming an angle of 90 degrees to 175 degrees in the transverse plane YOZ.

In practice, the free end of the left/right bottom fin airfoil may extend away from a corresponding plane P/P' parallel to the anteroposterior midplane XOZ and containing the first end of the left/right bottom fin airfoil to form an angle of inclination lying in the range 5 degrees to 45 degrees.

Such an angle of inclination of the left/right bottom fin airfoil serves specifically to limit the span of the horizontal stabilizer by reducing or even eliminating coupling problems.

Likewise, the free end of the left/right top fin airfoil may extend away from a corresponding plane P/P' parallel to the anteroposterior midplane XOZ and containing the first end of the left/right top fin airfoil to form an angle of inclination lying in the range 5 degrees to 45 degrees.

It can also be seen that such an angle of inclination for the left/right top fin airfoil serves to limit the span of the horizontal stabilizer by reducing or even eliminating coupling problems.

In an advantageous embodiment of the invention, the left/right bottom fin airfoil may be distinct from the corresponding left/right top fin airfoil.

In addition, the left/right bottom fin airfoil may have an angle of inclination relative to the corresponding plane P/P', a length, or indeed a twist, that is different from the angle of inclination relative to the corresponding plane P/P', to the length, or to the twist of the left/right top fin airfoil. Furthermore, the left/right bottom fin airfoil and the left/right top fin airfoil may also be made up of two different parts without forming a single-piece unit.

Advantageously, an orthogonal projection of each of the two fins onto a corresponding plane P/P' parallel to the anteroposterior midplane XOZ and containing one of the first ends of the left/right and bottom/top fin airfoils may present an arrow-head shape with a tip pointing towards the front zone of the rotorcraft.

Specifically, such an arrow-head shape for the orthogonal projections of the two fins onto the corresponding planes P/P' serves to increase a lever arm relative to the center of gravity of the rotorcraft and thereby improve the stability of the yaw control of the rotorcraft.

In practice, the tip of each orthogonal projection may co-operate with a corresponding left/right distal zone of the horizontal stabilizer.

In other words, each tip of the arrow-head shape of the orthogonal projections of the two fins onto the corresponding plane P/P' can be positioned in the elevation direction Z at the same level as the horizontal stabilizer, and each left/right and top/bottom fin airfoil can extend towards the rear zone of the rotorcraft in the longitudinal direction X.

In an advantageous embodiment of the invention, the horizontal stabilizer may be arranged symmetrically relative to the anteroposterior midplane XOZ.

Such symmetry for the horizontal stabilizer can be adapted specifically for certain variants of hybrid type rotorcraft and in particular for rotorcraft suitable for reaching high cruising speeds, that may typically reach, or even exceed, 200 knots (kt).

In another embodiment of the invention, the horizontal stabilizer may be arranged asymmetrically relative to the anteroposterior midplane XOZ.

Consequently, the horizontal stabilizer may present length dimensions in the OY direction, thickness dimensions in the OZ direction, and width dimensions in the OX direction that differ respectively from one another on either side of the anteroposterior midplane XOZ.

Likewise, in a first variant of the invention, the two fins may be arranged symmetrically relative to the anteroposterior midplane XOZ.

Nevertheless, in a second variant of the invention, the two fins may be arranged asymmetrically relative to the anteroposterior midplane XOZ.

Under such circumstances, and by way of example, the dimensions, the shapes, and the angular orientations of the left fin may differ respectively from those of the right fin.

BRIEF DESCRIPTION OF THE DRAWINGS

The invention and its advantages appear in greater detail in the context of the following description of embodiments given by way of non-limiting illustration and with reference to the accompanying figures, in which:

FIG. 5 is a front view of a fourth variant rotorcraft in accordance with the invention.

DETAILED DESCRIPTION OF THE INVENTION

Figure 1:
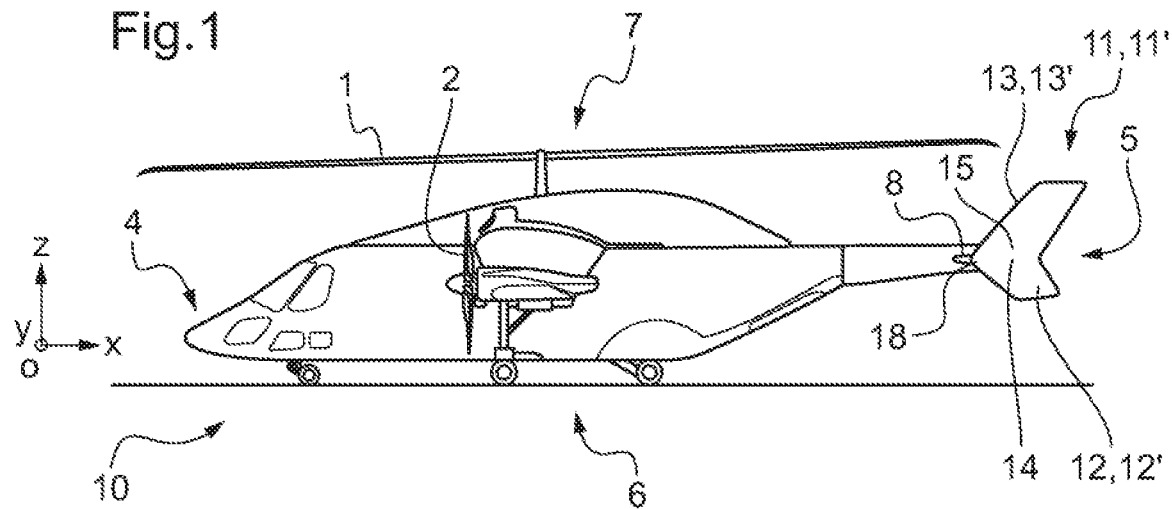
FIG. 1 is a side view of a first variant of a rotorcraft in accordance with the invention.

Elements present in more than one of the figures are given the same references in each of them, and naturally the invention is not limited solely to the examples shown diagrammatically by way of indication with angle values that are shown in the drawing in non-limiting manner. Specifically, for the angles of inclination or the orientation of the various fins, the angle values and also the ranges of angle values that are to be taken into consideration are those specified in the description given below.

It should be observed that three mutually orthogonal directions X, Y, and Z are shown in FIGS. 1 to 5.

The direction X is said to be "longitudinal" insofar as it extends along a longitudinal dimension towards a rear zone of a fuselage of a rotorcraft in accordance with the invention.

Another direction Y is said to be "transverse" and it extends perpendicularly to the axis X substantially along a transverse dimension towards the left of the fuselage of the rotorcraft in accordance with the invention.

Finally, a third axis Z is said to be "in elevation" and corresponds to the height dimensions of the fuselage of the rotorcraft in accordance with the invention.

As mentioned above, the invention thus relates to a hybrid type rotorcraft.

As shown in FIGS. 1 to 5, such a rotorcraft 10-50 thus has a main rotor 1 for providing the rotorcraft 10-50 with all or part of its lift and possibly with part of its propulsion, and two propulsion elements 2 and 2' mounted on two half-wings 3 and 3', the two propulsion elements 2 and 2' serving to provide the rotorcraft 10-50 with additional propulsion. The two half-wings 3, 3' can thus advantageously be arranged symmetrically on either side of an anteroposterior midplane XOZ of symmetry of the rotorcraft 10-50 and they are masked in part in FIGS. 2 to 5 so as to make it easier to visualize the variants of the rotorcraft 10-50 in front view.

In addition, such an anteroposterior midplane XOZ extends between a front zone 4 and a rear zone 5 of the rotorcraft 10-50 in a longitudinal direction X between a bottom zone 6 and a top zone 7 of the rotorcraft 10-50 in the elevation direction Z.

The rotorcraft 10-50 also has a horizontal stabilizer 8, 28 arranged in the rear zone 5 of the rotorcraft 10-50 on either side of the anteroposterior midplane XOZ. Advantageously, such a horizontal stabilizer 8 is then symmetrical about the anteroposterior midplane XOZ.

As shown, two fins 11-51 and 11'-51' are likewise arranged on respective sides of the anteroposterior midplane XOZ, and advantageously such fins 11-41, 11'-41 are symmetrical about the anteroposterior midplane XOZ.

A left fin 11-51 is thus positioned in a left distal zone 9 of the horizontal stabilizer 8, 28 and a right fin 11'-51' is positioned in a right distal zone 9' of the horizontal stabilizer 8, 28.

Each of the left/right fins 11-51, 11'-51' then has a left/right bottom fin airfoil 12-52, 12'-52' arranged below the horizontal stabilizer 8, 28, and a left/right top fin airfoil 13-53, 13'-53' arranged above the horizontal stabilizer 8, 28.

Furthermore, and as shown in FIG. 1, an orthogonal projection of the fin 11 on a plane P parallel to the anteroposterior midplane XOZ may present the shape of an arrow-head with its tip 18 pointing towards the front zone of the rotorcraft and co-operating with the distal zone 9 of the horizontal stabilizer 8.

Figure 2:
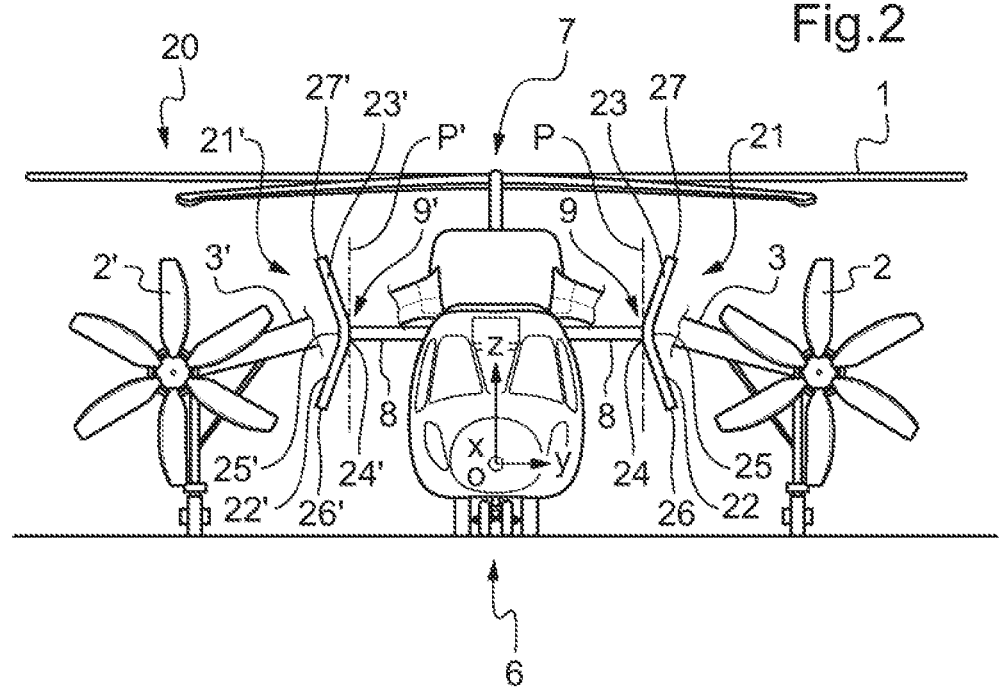
FIG. 2 is a front view of the first variant rotorcraft in accordance with the invention.

As shown in FIG. 2, the first variant rotorcraft 20 has a left fin 21 and a right fin 21', each presenting a respective left/right top fin airfoil 23, 23' extending in full away from a corresponding plane P/P', going away from the anteroposterior midplane XOZ.

Furthermore, in a transverse plane YOZ perpendicular to the anteroposterior midplane XOZ and intersecting the two fins 21 and 21', respective first ends 25, 25' of the left/right top fin airfoils 23, 23' are secured to the left/right distal zones 9, 9' contained in the corresponding planes P/P'. A free end 27 of the left top fin airfoil 23 extends away towards the left of the plane P, and a free end 27' of the right top fin airfoil 23' extends away towards the right of the plane P'.

Still in the first variant rotorcraft 20, the left/right bottom fin airfoils 22, 22' extend in full away from the corresponding planes P/P', going away from the anteroposterior midplane XOZ. Respective first ends 24, 24' of the left/right bottom fin airfoils 22, 22' are secured to the left/right distal zones 9, 9' contained in the corresponding planes P/P'. A free end 26 of the left bottom fin airfoil 22 extends away towards the left of the plane P and a free end 26' of the right bottom fin airfoil 22' extends away towards the right of the plane P'.

Thus, the free ends 26 and 27 of the left bottom/top fin airfoils 22, 23 co-operate with the first ends 24, 25 of the same left bottom/top fin airfoils 22, 23 to form respective dihedrals of angle lying in the range 90 degrees to 175 degrees. Likewise, the free ends 26', 27' of the right bottom/top fin airfoils 22', 23' co-operate with the first ends 24', 25' of the same right bottom/top fin airfoils 22', 23' to form respective dihedrals of angle lying in the range 90 degrees to 175 degrees.

Furthermore, the free end 27, 27' of the left/right top fin airfoil 23, 23' extends away from a corresponding plane P/P' parallel to the anteroposterior midplane XOZ and containing the first end 25, 25' of the left/right top fin airfoil 23, 23' to form an angle of inclination lying in the range 5 degrees to 45 degrees. As shown by way of example in FIG. 2, this angle is close to 20 degrees and is oriented away from the anteroposterior midplane XOZ.

Likewise, the free end 26, 26' of the left/right bottom fin airfoil 22, 22' extends away from a corresponding plane P/P' parallel to the anteroposterior midplane XOZ and containing the first end 24, 24' of the left/right bottom fin airfoil 22, 22' to form an angle of inclination lying in the range 5 degrees to 45 degrees. As shown by way of example in FIG. 2, this angle is likewise close to 20 degrees.

Figure 3:
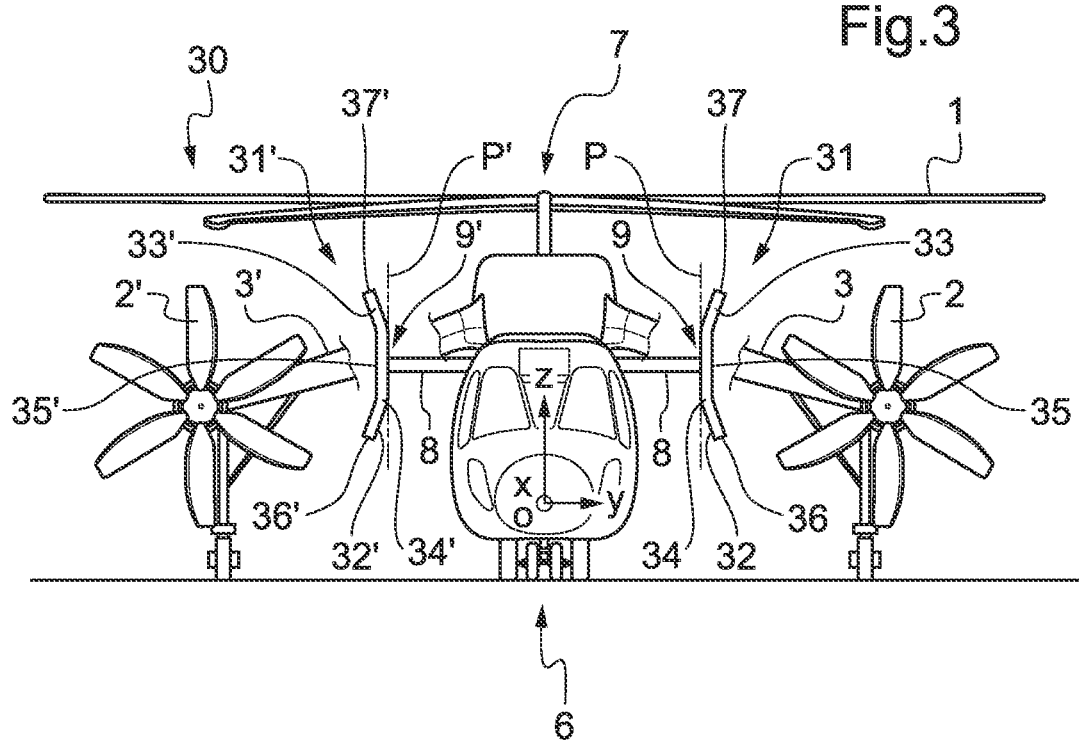
FIG. 3 is a front view of a second variant rotorcraft in accordance with the invention.

As shown in FIG. 3, the second variant rotorcraft 30 is remarkable in that the rotorcraft 30 has a left fin 31 and a right fin 31', each presenting a respective left/right top fin airfoil 33, 33' extending in part away from the corresponding plane P/P', going away from the anteroposterior midplane XOZ.

Consequently, in a transverse plane YOZ perpendicular to the anteroposterior midplane XOZ and intersecting the two fins 31 and 31', respective first ends 35, 35' of the left/right top fin airfoils 33, 33' are secured to the left/right distal zones 9, 9' contained in the corresponding planes P/P'. A free end 37 of the left top fin airfoil 33 extends away towards the left of the plane P, and a free end 37' of the right top fin airfoil 33' extends away towards the right of the plane P'.

In this second variant rotorcraft 30, each fin 31, 31' also has a left/right bottom fin airfoil 32, 32' that extends in part away from the corresponding plane P/P', going away from the anteroposterior midplane XOZ. Respective first ends 34, 34' of the left/right bottom fin airfoils 32, 32' are secured to the left/right distal zones 9, 9' contained in the corresponding planes P/P'. A free end 36 of the left bottom fin airfoil 32 extends away towards the left of the plane P and a free end 36' of the right bottom fin airfoil 32' extends away towards the right of the plane P'.

In addition, the free ends 36, 37 of the left bottom/top fin airfoils 32, 33 co-operate with the first ends 34, 35 of the same left bottom/top fin airfoils 32, 33 to form respective dihedrals of angle lying in the range 90 degrees to 175 degrees. Likewise, the free ends 36', 37' of the right bottom/top fin airfoils 32', 33' co-operate with the first ends 34', 35' of the same right bottom/top fin airfoils 32', 33' to form respective dihedrals of angle lying in the range 90 degrees to 175 degrees.

Furthermore, the free end 37, 37' of the left/right top fin airfoil 33, 33' extends away from a corresponding plane P/P' parallel to the anteroposterior midplane XOZ and containing the first end 35, 35' of the left/right top fin airfoil 33, 33' to form an angle of inclination lying in the range 5 degrees to 45 degrees. As shown by way of example in FIG. 3, this angle is close to 20 degrees and is oriented away from the anteroposterior midplane XOZ.

Likewise, the free end 36, 36' of the left/right bottom fin airfoil 32, 32' extends away from a corresponding plane P/P' parallel to the anteroposterior midplane XOZ and containing the first end 34, 34' of the left/right bottom fin 32, 32' to form an angle of inclination lying in the range 5 degrees to 45 degrees. As shown by way of example in FIG. 3, this angle is close to 20 degrees and is oriented away from the anteroposterior midplane XOZ.

Figure 4:
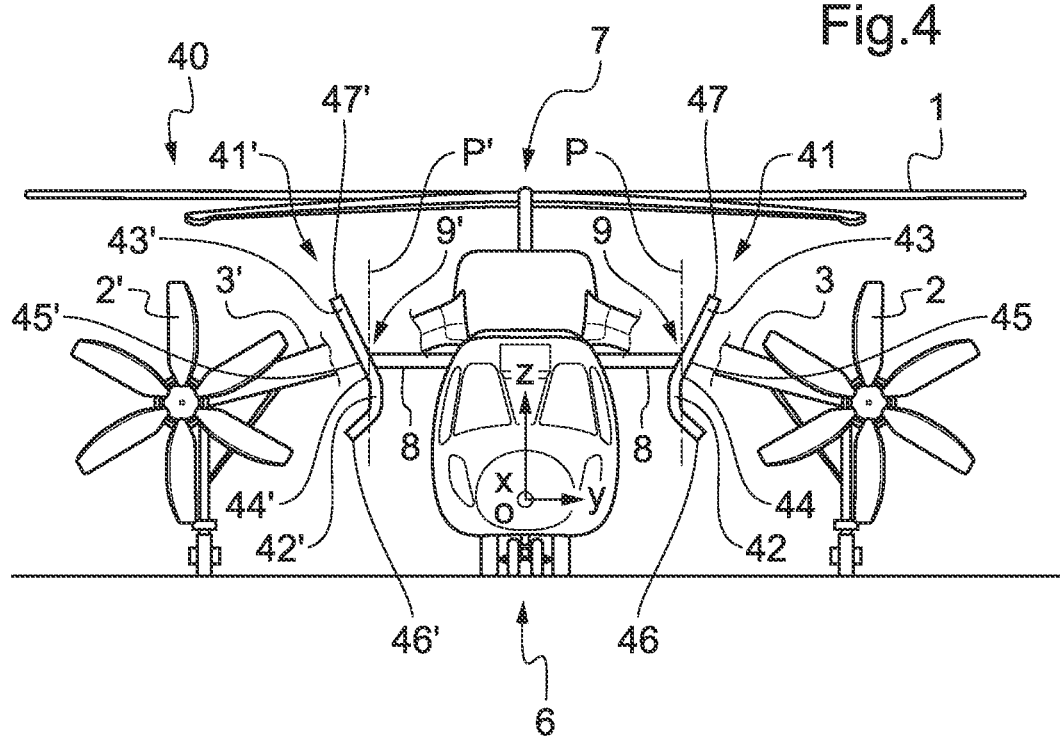
FIG. 4 is a front view of a third variant rotorcraft in accordance with the invention.

As shown in FIG. 4, a third variant rotorcraft 40 is remarkable in that the rotorcraft 40 has a left fin 41 and a right fin 41', each presenting a respective left/right top fin airfoil 43, 43' extending in full away from a corresponding plane P/P', going away from the anteroposterior midplane XOZ.

Furthermore, in a transverse plane YOZ perpendicular to the anteroposterior midplane XOZ and intersecting the two fins 41 and 41', respective first ends 45, 45' of the left/right top fin airfoils 43, 43' are secured to the left/right distal zones 9, 9' contained in the corresponding planes P/P'. A free end 47 of the left top fin airfoil 43 extends towards the left of the plane P and a free end 47' of the right top fin airfoil 43' extends away towards the right of the plane P'.

Likewise, the rotorcraft 40 has a left fin 41 and a right fin 41', each presenting a respective left/right bottom fin airfoil 42, 42' extending away from the anteroposterior midplane XOZ. A first end 44, 44' of each of the left/right bottom fin airfoils 42, 42' is secured to the right/left distal zone 9, 9' contained in the corresponding plane P/P'. A free end 46 of the left bottom fin airfoil 42 extends away towards the left of the plane P, and a free end 46' of the right bottom fin airfoil 42' extends away towards the right of the plane P'.

Consequently, the free ends 46, 47 of the left bottom/top fin airfoils 42, 43 co-operate with the first ends 44, 45 of the same left bottom/top fin airfoils 42, 43 to form respective dihedrals of angle lying in the range 90 degrees to 175 degrees. Likewise, the free ends 46', 47' of the right bottom/top fin airfoils 42', 43' co-operate with the first ends 44', 45' of the same right bottom/top fin airfoils 42', 43' to form respective dihedrals of angle lying in the range 90 degrees to 175 degrees.

Furthermore, the free end 47, 47' of each left/right top fin airfoil 43, 43' co-operates with the corresponding plane P/P' parallel to the anteroposterior midplane XOZ and containing the first end 45, 45' of the same left/right top fin airfoil 43, 43' to form a respective angle of inclination lying in the range 5 degrees to 45 degrees. As shown by way of example in FIG. 4, this angle is close to 25 degrees and is oriented away from the anteroposterior midplane XOZ.

Likewise, the free end 46, 46' of each left/right bottom fin airfoil 42, 42' co-operates with the corresponding plane P/P' parallel to the anteroposterior midplane XOZ and containing the first end 44, 44' of the same left/right bottom fin airfoil 42, 42' to form a respective angle of inclination lying in the range 5 degrees to 45 degrees. As shown by way of example in FIG. 4, this angle is close to 15 degrees and is oriented away from the anteroposterior midplane XOZ.

As shown in FIG. 5, the fourth variant rotorcraft 50 has a left fin 51 and a right fin 51' presenting respective shapes, dimensions, and angular orientations that are different from each other. A left top fin airfoil 53, a left bottom fin airfoil 52, a right top fin airfoil 53', and a right bottom fin airfoil 52' extend in full away from corresponding planes P/P', going away from the anteroposterior midplane XOZ.

Furthermore, in a transverse plane YOZ perpendicular to the anteroposterior midplane XOZ and intersecting the two fins 51 and 51', a first end 55 of the left top fin airfoil 53 and a first end 54' of the right bottom fin airfoil 52' are respectively secured to the left/right distal zones 9, 9' contained in the corresponding planes P/P'. Likewise, a first end 54 of the left bottom fin airfoil 52 and a first end 55' of the right top fin airfoil 53' are secured to the left/right distal zones 9, 9' contained in the corresponding planes P/P'.

In addition, a free end 57 of the left top fin airfoil 53 and a free end 56 of the left bottom fin airfoil 52 extend to the left of the plane P. Likewise, a free end 56' of the right bottom fin airfoil 52' and a free end 57' of the right top fin airfoil 53' extend towards the right of the plane P'.

Thus, the free ends 56, 57 of the left bottom/top fin airfoils 52, 53 co-operate with the first ends 54, 55 of the same left bottom/top fin airfoils 52, 53 to form respective dihedrals of angle lying in the range 90 degrees to 175 degrees. Likewise, the free ends 56', 57' of the right bottom/top fin airfoils 52', 53' co-operate with the first ends 54', 55' of the same right bottom/top fin airfoils 52', 53' to form respective dihedrals of angle lying in the range 90 degrees to 175 degrees.

Furthermore, the free end 57 of the left top fin airfoil 53 and the free end 56' of the right bottom fin airfoil 52' extend away from corresponding planes P/P' parallel to the anteroposterior midplane XOZ and respectively containing the first end 55 of the left top fin airfoil 53 and the first end 54' of the right bottom fin airfoil 52' to form respective angles of inclination lying in the range 5 degrees to 45 degrees. As shown by way of example in FIG. 5, this angle is close to 10 degrees for the left top fin airfoil 53 and for the left bottom fin airfoil 52 and close to 25 degrees for the right bottom fin airfoil 52' and for the right top fin airfoil 53', and they are oppositely oriented relative to the anteroposterior midplane XOZ.

Still in the fourth variant rotorcraft 50, the horizontal stabilizer 28 may be asymmetrical relative to the anteroposterior midplane XOZ. As shown, the stabilizer 28 may have a left length dimension along the direction OY that is shorter than a right length dimension.

Naturally, the present invention may be subjected to numerous variants as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A hybrid type rotorcraft comprising:
    a main rotor providing at least all or part of lift of the rotorcraft;
    at least two propulsion elements providing all or part of propulsion of the rotorcraft, the two propulsion elements each being mounted on a respective half-wing, the half-wings being arranged symmetrically on either side of an anteroposterior midplane XOZ of symmetry of all or part of the rotorcraft, the anteroposterior midplane XOZ extending between a front zone and a rear zone of the rotorcraft in a longitudinal direction X and between a bottom zone and a top zone of the rotorcraft in a direction in elevation Z;
    a horizontal stabilizer arranged in the rear zone of the rotorcraft on either side of the anteroposterior midplane XOZ; and
    two fins arranged on respective sides of the anteroposterior midplane XOZ, the two fins consisting in a left fin positioned at a left distal zone of the horizontal stabilizer and a right fin positioned at a right distal zone of the horizontal stabilizer, each of the left/right fins respectively comprising a left/right bottom fin airfoil arranged below the horizontal stabilizer and a left/right top fin airfoil arranged above the horizontal stabilizer, the left bottom/top fin airfoils and the right bottom/top fin airfoils being rigidly secured to the horizontal stabilizer,
    the left bottom fin airfoil approaching the left top fin airfoil from their respective junctions with the horizontal stabilizer and the right bottom fin airfoil approaching the right top fin airfoil from their respective junctions with the horizontal stabilizer, the left bottom/top fin airfoils extending in full or in part, at least in their free ends, away from the anteroposterior midplane XOZ, and the right bottom/top fin airfoils extending in full or in part, at least at their free ends, away from the anteroposterior midplane XOZ,
    wherein the two fins are arranged asymmetrically relative to the anteroposterior midplane XOZ, the left fin presenting angular orientations relative to a left plane different from angular orientations of the right fin relative to a right plane.

2. The rotorcraft according to claim 1, wherein, in a transverse plane YOZ perpendicular to the anteroposterior midplane XOZ and intersecting the two fins, all four of the left/right and bottom/top fin airfoils have respective first ends secured to the horizontal stabilizer and respective free ends, the free ends of the left bottom/top fin airfoils co-operating with the first ends of the left bottom/top fin airfoils to form a dihedral of angle lying in the range 90 degrees to 175 degrees, and the free ends of the right bottom/top fin airfoils co-operating with the first ends of the right bottom/top fin airfoils to form a dihedral of angle lying in the range 90 degrees to 175 degrees.

3. The rotorcraft according to claim 2, wherein the free end of the left/right bottom fin airfoil extends away from a corresponding plane P/P' parallel to the anteroposterior midplane XOZ and containing the first end of the left/right bottom fin airfoil to form an angle of inclination lying in the range 5 degrees to 45 degrees.

4. The rotorcraft according to claim 2, wherein the free end of the left/right top fin airfoil extends away from a corresponding plane P/P' parallel to the anteroposterior midplane XOZ and containing the first end of the left/right top fin to form an angle of inclination lying in the range 5 degrees to 45 degrees.

5. The rotorcraft according to claim 1, wherein the left/right bottom fin airfoil is distinct from the corresponding left/right top fin airfoil.

6. The rotorcraft according to claim 1, wherein an orthogonal projection of each of the two fins onto a corresponding plane P/P' parallel to the anteroposterior midplane XOZ and containing one of the first ends of the left/right and bottom/top fin airfoils presents an arrow-head shape with a tip pointing towards the front zone of the rotorcraft.

7. The rotorcraft according to claim 6, wherein the tip of each orthogonal projection co-operates with a corresponding left/right distal zone of the horizontal stabilizer.

8. The rotorcraft according to claim 1, wherein the horizontal stabilizer is arranged symmetrically relative to the anteroposterior midplane XOZ.

9. The rotorcraft according to claim 1, wherein the horizontal stabilizer is arranged asymmetrically relative to the anteroposterior midplane XOZ.

10. The rotorcraft according to claim 1, wherein the left fin is shaped differently than the right fin.

11. The rotorcraft according to claim 1, wherein the free ends of left fin are spaced differently from the anteroposterior midplane XOZ than the free ends of right fin.

12. The rotorcraft according to claim 1, wherein the left fin is shaped differently than the right fin and the free ends of left fin are spaced differently from the anteroposterior midplane XOZ than the free ends of right fin.

13. The rotorcraft according to claim 12, wherein the left/right bottom fin airfoil is distinct from the corresponding left/right top fin airfoil.

14. The rotorcraft according to claim 1, wherein the free end of the left bottom fin airfoil extends away from a corresponding plane P/P' parallel to the anteroposterior midplane XOZ at a first angle and the free end of the right bottom fin airfoil extends away from a corresponding plane P/P' parallel to the anteroposterior midplane XOZ at a second angle, wherein one of the first and second angles is at least twice as much as the other of the second and first angles and wherein the free end of the left top fin airfoil extends away from a corresponding plane P/P' parallel to the anteroposterior midplane XOZ at a third angle and the free end of the right top fin airfoil extends away from a corresponding plane P/P' parallel to the anteroposterior midplane XOZ at a third angle, wherein one of the third and fourth angles is at least twice as much as the other of the third and fourth angles.

15. The rotorcraft according to claim 1, wherein the left distal zone of the horizontal stabilizer and the distal zone of the horizontal stabilizer are spaced at different distances from the anteroposterior midplane XOZ, such that one of the left distal zone or the right distal zone of the horizontal stabilizer is closer to the anteroposterior midplane XOZ than the other of the right distal zone and the left distal zone of the horizontal stabilizer.

16. A hybrid type rotorcraft comprising:
a main rotor mounted to the rotorcraft and capable of providing lift of the rotorcraft;
two propulsion elements capable of providing propulsion of the rotorcraft, each of the two propulsion elements mounted on a respective half-wing, the half-wings arranged symmetrically on either side of an anteroposterior midplane of symmetry of the rotorcraft, the anteroposterior midplane extending between a front zone and a rear zone of the rotorcraft in a longitudinal direction and between a bottom zone and a top zone of the rotorcraft in a direction in elevation;
a horizontal stabilizer arranged in the rear zone of the rotorcraft on either side of the anteroposterior midplane; and
two fins arranged on respective sides of the anteroposterior midplane, the two fins comprising a left fin positioned at a left distal zone of the horizontal stabilizer and a right fin positioned at a right distal zone of the horizontal stabilizer, each of the left/right fins respectively comprising a left/right bottom fin airfoil arranged below the horizontal stabilizer and a left/right top fin airfoil arranged above the horizontal stabilizer, the left bottom/top fin airfoils and the right bottom/top fin airfoils being rigidly secured to the horizontal stabilizer, the left bottom fin airfoil approaching the left top fin airfoil from their respective junctions with the horizontal stabilizer and the right bottom fin airfoil approaching the right top fin airfoil from their respective junctions with the horizontal stabilizer, the left bottom/top fin airfoils extending in their free ends away from the anteroposterior midplane, and the right bottom/top fin airfoils extending in their free ends away from the anteroposterior midplane,
wherein the two fins are arranged asymmetrically relative to the anteroposterior midplane, the left fin presenting angular orientations relative to a left plane significantly different from angular orientations of the right fin relative to a right plane.

17. The rotorcraft according to claim 16, wherein, in a transverse plane perpendicular to the anteroposterior midplane and intersecting the two fins, all four of the left/right and bottom/top fin airfoils have respective first ends secured to the horizontal stabilizer and respective free ends, the free ends of the left bottom/top fin airfoils co-operating with the first ends of the left bottom/top fin airfoils to form a dihedral of angle lying in the range 90 degrees to 175 degrees, and the free ends of the right bottom/top fin airfoils co-operating with the first ends of the right bottom/top fin airfoils to form a dihedral of angle lying in the range 90 degrees to 175 degrees.

18. The rotorcraft according to claim 17, wherein the free end of the left/right bottom fin airfoil extends away from a corresponding plane parallel to the anteroposterior midplane and containing the first end of the left/right bottom fin airfoil to form an angle of inclination lying in the range 5 degrees to 45 degrees and wherein the free end of the left/right top fin airfoil extends away from a corresponding plane parallel to the anteroposterior midplane and containing the first end of the left/right top fin to form an angle of inclination lying in the range 5 degrees to 45 degrees.

19. A hybrid type rotorcraft comprising:
a main rotor mounted to the rotorcraft and capable of providing lift of the rotorcraft;
two propulsion elements capable of providing propulsion of the rotorcraft, each of the two propulsion elements mounted on a respective half-wing, the half-wings arranged symmetrically on either side of an anteroposterior midplane of symmetry of the rotorcraft, the anteroposterior midplane extending between a front zone and a rear zone of the rotorcraft in a longitudinal direction and between a bottom zone and a top zone of the rotorcraft in a direction in elevation;
a horizontal stabilizer arranged in the rear zone of the rotorcraft on either side of the anteroposterior midplane; and
two fins arranged on respective sides of the anteroposterior midplane, the two fins comprising a left fin positioned at a left distal zone of the horizontal stabilizer and a right fin positioned at a right distal zone of the horizontal stabilizer, each of the left/right fins respectively comprising a left/right bottom fin airfoil arranged below the horizontal stabilizer and a left/right top fin airfoil arranged above the horizontal stabilizer, the left bottom/top fin airfoils and the right bottom/top fin airfoils being rigidly secured to the horizontal stabilizer, the left bottom fin airfoil approaching the left top fin airfoil from their respective junctions with the horizontal stabilizer and the right bottom fin airfoil approaching the right top fin airfoil from their respective junctions with the horizontal stabilizer, the left bottom/top fin airfoils extending in their free ends away from the anteroposterior midplane, and the right bottom/top fin airfoils extending in their free ends away from the anteroposterior midplane,
wherein the two fins are arranged asymmetrically relative to the anteroposterior midplane, the left fin having a first shape and the right fin having a second shape, different than the first shape, the first shape of the left fin presenting a first angular orientation relative to a left plane, and the second shape of the right fin presenting a second angular orientation relative to a right plane, the first angular orientation being significantly different from second angular orientation.

20. The rotorcraft according to claim 19, wherein one of the first and second angular orientations is at least twice as much as the other of the second and first angular orientations.

* * * * *